Feb. 5, 1935. M. E. BIVENS 1,990,366
ELECTRIC TRANSLATION CIRCUITS
Filed Jan. 9, 1931
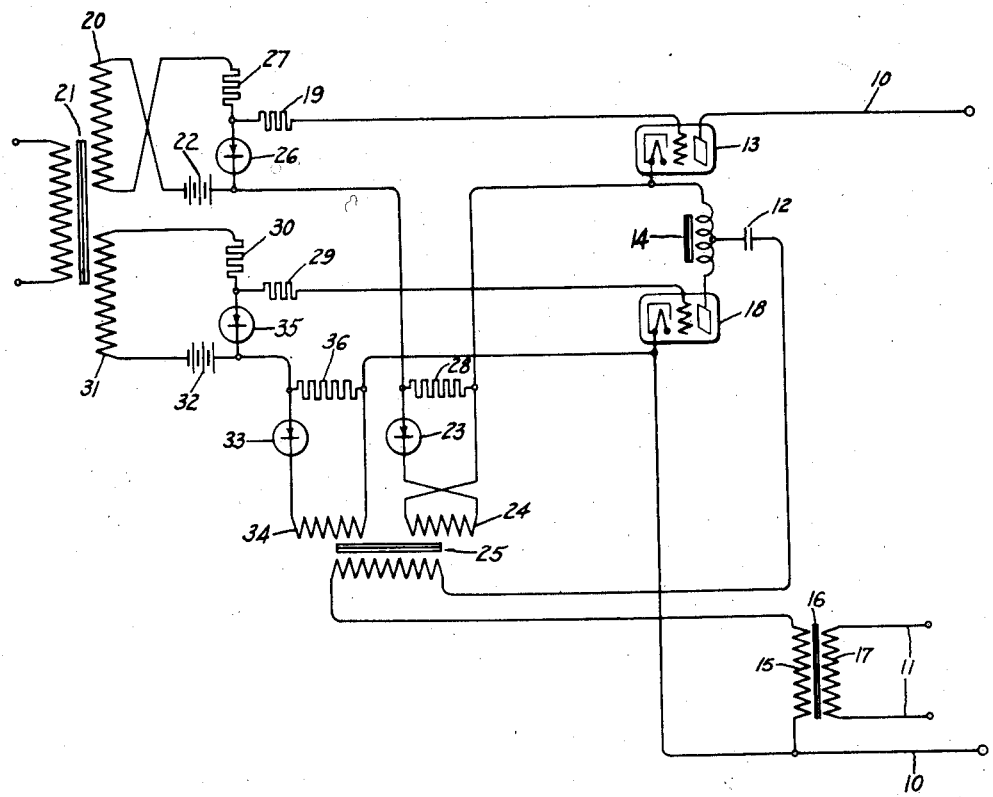
Inventor:
Maurice E. Bivens,
by Charles E. Mullan
His Attorney.

Patented Feb. 5, 1935

1,990,366

UNITED STATES PATENT OFFICE 1,990,366

ELECTRIC TRANSLATION CIRCUITS

Maurice E. Bivens, Scotia, N. Y., assignor to General Electric Company, a corporation of New York Application January 9, 1931, Serial No. 507,748

12 Claims. (Cl. 175—363)

My invention relates to electric translation circuits and more particularly to such circuits involving the use of electric valves.

In many translation circuits utilizing electric valves, such, for example, as those adapted to convert direct current into alternating current, it is absolutely imperative for satisfactory operation of the apparatus that not more than one of the electric valves should be conductive at any given instant. For example, in the case of such a circuit including electric valves for converting direct current into alternating current, known in the art as an inverter, the conductivity of the valves is controlled by the potentials of their control grids which are often excited from an independent source of alternating current. In the case of abnormal conditions in this alternating current exciting circuit, it sometimes occurs that a positive potential is impressed upon the control grid of one of the valves at an improper point in the cycle of operation of the apparatus while the other valve is still conducting current.

It is an object of my invention to provide an improved electric translation circuit including electric valves which will obviate the above mentioned disadvantages of the arrangements of the prior art and which shall be simple and reliable in operation.

It is a further object of my invention to provide an improved electric translation circuit including a pair of electric valves in which it is impossible for one valve to be rendered conducting due to abnormal conditions of the excitation circuit as long as current is flowing in the other valve.

In accordance with my invention I provide a pair of grid circuits for the two electric valves, each containing the secondary winding of a grid transformer which is shunted by a unilaterally conductive device so connected that positive half-cycles of the grid potential are shunted from the grid of the valve. Connected in series with each of these grid circuits is a secondary winding of a second transformer which is energized from the alternating current circuit of the apparatus so that the polarity of the secondary potential is dependent upon which valve is conducting. Connected in series with each of these secondary windings is a unilaterally conductive device so connected that the positive half-cycles of the potentials of this transformer are held back from the grid circuit. With this arrangement, the grid potential of each of the electric valves normally reaches a sufficiently small negative value or very slightly positive potential during alternate half-cycles to render the valves conducting alternately. However, should the negative grid potential of one of the valves derived from the independent source be reduced to such a value as to allow that valve to become conductive while the other is still passing current, the current flowing in the second valve induces such a potential in the secondary winding associated with the grid circuit of the first valve as to impress a negative potential upon the grid of this valve and thus positively hold it non-conducting.

For a better understanding of my invention together with other and further objects thereof reference is had to the following description taken in connection with the accompanying drawing and its scope will be pointed out in the appended claims. The single figure of the accompanying drawing is a diagrammatic representation of one embodiment of my invention as applied to an electric power converting apparatus known in the art as a series inverter.

Referring now to the drawing, I have illustrated an apparatus for receiving energy from the direct current circuit 10, converting it into alternating current, and delivering it to the load circuit 11. This apparatus comprises a capacitor 12 and a circuit for charging the capacitor from the source comprising an electric valve 13, the upper half of an inductive winding 14, the primary winding of transformer 25, and the primary winding 15 of a transformer 16, the secondary winding 17 of which is connected to the load circuit 11. The capacitor 12 is also provided with a discharge circuit comprising the lower half of the inductive winding 14, an electric valve 18, the primary winding 15 and the primary winding of transformer 25. Electric valves 13 and 18 are each provided with an anode, a cathode and a control grid and may be of any of the several types well known in the art, although I prefer to use valves of the vapor electric discharge type in which the starting of current in the valve is determined by the potential on its control grid but in which the current through the valve may be interrupted only by reducing its anode potential below the critical value. These valves preferably also have a negative grid potential characteristic, that is, current may be started in the valve by reducing the negative grid potential to some small value. This power converting apparatus together with a conventional arrangement for periodically and alternately rendering the valves 13 and 18 conducting is described and claimed in United States Letters Patent No. 1,752,247 granted March 25, 1930, upon an application of Alan S. Fitz Gerald, and forms no part of the present invention. In order to insure that neither valve may be rendered conducting while the other valve is passing current, I have provided an improved excitation circuit for electric valves 13 and 18. The grid circuit of the electric valve 13 includes a current limiting resistor 19, the secondary winding 20 of a grid transformer 21, a negative bias battery 22, a uni-laterally conductive device 23 and the secondary winding 24 of a transformer 25. The primary winding of the transformer 21 is energized from any suitable source of alternating potential of a frequency equal to that which it is desired to deliver to the receiving circuit 11. The primary winding of the transformer 25 is connected in series with the primary winding 15 of the output transformer 16. A uni-laterally conductive device 26 is connected across the secondary winding 20 of the transformer 21 and the negative bias battery 22. This device virtually short circuits any positive half-cycles of alternating potential and insures that only a negative potential will be applied to the grid of the electric valve 13 from the transformer 21. If desired, a current limiting resistor 27 may be included in the circuit of the secondary winding 20 in order to limit the current in the circuit during those half-cycles in which the device 26 is conducting. It also may be found desirable to connect a resistor 28 across the secondary winding 24 of the transformer 25 and the uni-laterally conductive device 23. A similar grid circuit is provided for electric valve 18 including current limiting resistors 29 and 30, the secondary winding 31 of the transformer 21, a negative bias battery 32, a uni-laterally conductive device 33, and the secondary winding 34 of the transformer 25. As in the case of the grid circuit of valve 13, a uni-laterally conductive device 35 is connected across the resistor 30, the secondary winding 31, and the battery 32 and a resistor 36 is connected across the secondary winding 34 and the device 33.

In explaining the operation of the above described apparatus it will be assumed that the conditions of the exciting circuit of the grid transformer 21 are initially normal so that a sine wave of alternating potential is supplied to the secondary windings 20 and 31. With this condition, the electric valves 13 and 18 are alternately rendered conductive, the capacitor 12 becoming charged from the source 10 while the valve 13 is conducting and discharging through the valve 18 while it is conducting, thus delivering an alternating current to the receiving circuit 11 as is well understood by those skilled in the art, or as is explained more fully in the above mentioned patent. The function of the uni-laterally conductive devices 26 and 35 connected across the secondary windings 20 and 31 respectively is to prevent a positive potential from being supplied to the grids of electric valves 13 and 18, but, since these valves have negative grid potential characteristics, they will be rendered conductive during their respective positive half-cycles of grid potential when their grid potentials are substantially zero. If now, due to a transient effect or some other cause, the polarity of the grid potential applied to the transformer 21 should be reversed while the valve 13 is conducting, the negative potential applied to the grid of the valve 18 would be zero, that valve would become conductive, and a virtual short circuit would be provided for the source 10 through the valves 13 and 18 and the inductive winding 14, since the impedance of the inductive winding 14 is very low to direct current. In order to prevent this short circuiting of the direct current circuit 10, I have provided a second grid transformer 25 which is energized in series with the primary winding of the transformer 16 and is thus responsive to the direction of current flowing through this winding, which, in turn, is dependent upon which of the valves 13 and 18 is conducting. Each of the grid circuits of the valves 13 and 18 includes a potential derived from this grid transformer 25 which is so connected that a negative potential is impressed upon the grid of one of the valves whenever the other valve is conducting current. Under the assumed conditions, as the grid potential reverses polarity while the electric valve 13 is conducting, the secondary winding 31 of the transformer 21 will tend to impress a positive potential upon the grid of electric valve 18. However, the uni-laterally conductive device 35 is so connected as to pass current in this direction so that substantially the whole potential of the winding 31 is consumed in the resistor 30 and the potential impressed upon the grid of the valve 18 from the winding 31 will be substantially zero. At the same time, the current flowing in electric valve 13 flows through the primary winding of the grid transformer 25 in such a direction as to induce a potential in the winding 34 which impresses a negative potential on the grid of the valve 18, thus positively preventing this valve from becoming conducting as long as the valve 13 is conducting current. In order to prevent the secondary windings 24 and 34 of the transformer 25 from impressing positive potentials upon the grids of the valves 13 and 18 which would interfere with the normal operation of the apparatus, the uni-laterally conductive devices 23 and 33 respectively, have been connected in series with these windings to interrupt the positive half cycles induced in them. In addition, the resistors 28 and 36 have been connected across the secondary windings 24 and 34, respectively, in order that this circuit may not interfere with the normal operation of the main grid exciting circuits.

While I have stated above that the electric valves 13 and 18 preferably have negative grid potential characteristics, it will be obvious to those skilled in the art that valves having positive grid potential characteristics may be used by including a small resistance in series with the uni-laterally conductive devices 26 and 35 in the grid circuits so that a small portion of the positive half-cycles of the windings 20 and 31 may be impressed upon the grids of the valves 13 and 18 respectively. Also, it will be obvious that the primary winding of the transformer 25 may be connected to any other portion of the alternating current circuit which will give an indication as to which of the valves 13 and 18 is conducting current, all without departing from my invention.

While I have described what I at present consider the preferred embodiment of my invention it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In combination, an electric translation circuit including a plurality of electric valves, means for normally controlling the conductivity of said valves, and means responsive to the conductivity of certain of said valves for rendering ineffective abnormal conditions in the conductivity controlling means of the other valves.

2. In combination, an electric power converting apparatus including a plurality of electric valves, means for normally controlling the conductivity of said valves, and means responsive to the flow of current in one of said valves for rendering ineffective abnormal conditions in the conductivity controlling means with respect to another of said valves.

3. In combination, an electric power converting apparatus including a pair of electric valves each provided with a control grid, means for exciting said control grids to render said valves alternately conductive, and means responsive to the flow of current in one of said valves for rendering ineffective abnormal conditions in said exciting means with respect to the other valve.

4. In combination, an electric power converting apparatus including a pair of electric valves each provided with a control grid, a grid circuit for each of said valves including a source of alternating potential for exciting said grids and means for substantially shunting the positive half cycles of said potentials from said grids, and means responsive to the flow of current in one of said valves for rendering said exciting means ineffective to render the other valve conductive.

5. In combination, an electric power converting apparatus including a pair of electric valves each provided with a control grid and a grid circuit for each of said valves including a source of alternating potential, means for substantially shunting the positive half cycles of said potentials from said grids, and means for impressing a negative bias upon either of said grids when the other valve is conductive.

6. In combination, an electric power converting apparatus including a pair of electric valves each provided with a cathode, an anode and a control grid, a grid transformer provided with a pair of secondary windings, a grid circuit for each of said valves including one of said secondary windings and a unilaterally conductive device connected in parallel thereto, and means for impressing a negative bias upon either of said grids when the other valve is conductive.

7. In combination, an electric power converting apparatus including a pair of electric valves each provided with a control grid, means for exciting said control grids to render said valves alternately conductive, a grid transformer having a primary winding energized from the alternating current circuit of said apparatus, and a pair of secondary windings, each connected to the grid of one of said valves, and a unilaterally conductive device in each of said grid connections whereby a negative bias potential is impressed upon the grid of either valve whenever the other valve is conducting.

8. In combination, an electric power converting apparatus including a pair of electric valves each provided with a control grid, grid circuits for exciting said control grids to render said valves alternately conductive, a grid transformer having a primary winding energized from the alternating current circuit of said apparatus and a pair of secondary windings, and a resistor and a unilaterally conductive device connected in circuit with each of said secondary windings, each of said resistors being included also in one of said grid circuits.

9. In combination, a source of direct current, a pair of electric valves each provided with an anode, a cathode, and a control grid, a capacitor, a circuit for charging said capacitor from said source including one of said valves, a circuit for discharging said capacitor including the other of said valves, means for normally rendering said valves alternately conductive, and means responsive to the flow of current in one of said valves to prevent the other valve from becoming conductive due to abnormal conditions in said conductivity controlling means.

10. In combination, an electric valve provided with an anode, a cathode, and a control grid, a grid circuit connecting said grid and cathode and including a source of alternating potential, a unilaterally conductive device connected in parallel to said source to shunt half cycles of said potential of a predetermined polarity from said grid, and means included in said control circuit for maintaining said valve nonconductive under predetermined circuit conditions comprising a source of alternating current potentials variable in accordance with said conditions.

11. An electric translating circuit including an electric valve provided with an anode, a cathode, and a control electrode, a control circuit for said control electrode including a source of potential for rendering said valve conductive, and means for maintaining said valve nonconductive under predetermined circuit conditions comprising a source of alternating potential variable in accordance with said circuit conditions and included in said control circuit, and means for suppressing the positive half cycles of said alternating potential from said grid.

12. An electric translating circuit including an electric valve provided with an anode, a cathode, and a control electrode, a control circuit for said control electrode including a source of periodic potential for periodically rendering said valve conductive, and means for maintaining said valve nonconductive under predetermined circuit conditions comprising a source of alternating potential variable in accordance with said circuit conditions and included in said control circuit, and rectifier means connected in circuit with said source of alternating potential for suppressing the positive half cycles of said alternating potential from said grid.

MAURICE E. BIVENS.